United States Patent [19]
Nitta et al.

[11] Patent Number: 5,572,531
[45] Date of Patent: Nov. 5, 1996

[54] DIGITAL RADIOTELEPHONE SYSTEM

[75] Inventors: Koji Nitta, Fukuoka; Yuji Sumi, Shime-machi, both of Japan

[73] Assignee: Matsushita Electric Industrial Co. Ltd., Osaka, Japan

[21] Appl. No.: 399,485

[22] Filed: Mar. 7, 1995

[30] Foreign Application Priority Data

Mar. 7, 1994 [JP] Japan .................................. 6-035664

[51] Int. Cl.$^6$ .................................................. H04Q 7/30
[52] U.S. Cl. ............................ 370/112; 379/58; 455/38.1
[58] Field of Search ................................. 379/56, 58, 63;
340/825.47; 455/31.1, 34.1, 38.1, 53.1,
54.1, 54.2; 370/62, 112

[56] References Cited

U.S. PATENT DOCUMENTS

| | | | |
|---|---|---|---|
| 4,542,262 | 9/1985 | Ruff | 379/59 |
| 4,635,285 | 1/1987 | Coombes | 379/63 |
| 4,646,345 | 2/1987 | Zdunek et al. | 455/38.1 |
| 4,649,567 | 3/1987 | Childress | 379/63 |
| 4,748,655 | 5/1988 | Thrower et al. | 379/60 |
| 4,776,000 | 10/1988 | Parienti | 379/62 |
| 4,953,198 | 8/1990 | Daly et al. | 379/61 |
| 5,390,360 | 2/1995 | Scop et al. | 455/38.1 |

*Primary Examiner*—Benedict V. Safourek
*Attorney, Agent, or Firm*—Ratner & Prestia

[57] ABSTRACT

A digital radio telephone system for establishing communications between a main unit and a sub unit and between a plurality sub units. The system includes a main unit and a plurality of sub units. In order to establish communications with a sub unit, a calling signal including the sub unit extension number is first sent through the main unit to the sub unit. If the sub unit corresponding to an extension number in the calling signal is available, a calling acceptable signal is transmitted by the sub unit. The main unit includes an extension number multiplexer which multiplexes a plurality of sub unit extension numbers into one calling signal. Therefore, a calling signal from the main unit and calling signals from a plurality of sub units are multiplexed (combined) into a single calling signal. The main unit need only transmit a single multiplexed calling signal instead of a plurality of individual calling signals to each sub unit.

17 Claims, 9 Drawing Sheets

| octet \ bit | 8 | 7 | 6 | 5 | 4 | 3 | 2 | 1 |
|---|---|---|---|---|---|---|---|---|
| 1 | setting kind of callings ||||  the extention number of the first sub unit 120 (first digit) ||||
| 2 | the extention number of the first sub unit 120 (second digit) |||| 0 | 0 | 0 | 0 |
| 3 | the extention number of the second sub unit 122 (first digit) |||| the extention number of the second sub unit 122 (second digit) ||||
| 4 | 0 | 0 | 0 | 0 | the extention number of the third sub unit 127 (first digit) ||||
| 5 | the extention number of the third sub unit 127 (second digit) |||| 0 | 0 | 0 | 0 |
| 6 | the extention number of the fourth sub unit (first digit) |||| the extention number of the fourth sub unit (second digit) ||||
| 7 | 0 | 0 | 0 | 0 | 0 | 0 | 0 | 0 |

FIG. 3

| bit<br>octet | 8 | 7 | 6 | 5 | 4 | 3 | 2 | 1 |
|---|---|---|---|---|---|---|---|---|
| 1 | | | | | 0 | 0 | 0 | 1 |
| 2 | 0 | 0 | 1 | 0 | 0 | 0 | 0 | 0 |
| 3 | 0 | 0 | 0 | 1 | 0 | 0 | 1 | 1 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

The extention number of second sub unit 332 (second digit)

The extention number of second sub unit 332 (first digit)

The extention number of third sub unit 333 (first digit)

The extention number of third sub unit 333 (second digit)

FIG. 7

| bit<br>octet | 8 | 7 | 6 | 5 | 4 | 3 | 2 | 1 |
|---|---|---|---|---|---|---|---|---|
| 1 | | | | | 0 | 0 | 0 | 1 |
| 2 | 0 | 0 | 1 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

The extention number of the first sub unit 20 (first digit)

The extention number of the first sub unit 20 (second digit)

FIG. 9
PRIOR ART

DIGITAL RADIOTELEPHONE SYSTEM

BACKGROUND OF THE INVENTION

The present invention relates to a radiotelephone system having a plurality of sub units for a main unit.

Recently, digital radiotelephone systems have been widely used because of their enhanced convenience and reasonable prices. Among them, especially cordless and radiotelephone systems having a main unit and plural sub units and a limited communication area for office or home use have been spread.

A conventional digital radiotelephone system will be described referring to drawings. FIG. 8 is a block diagram showing the structure of a conventional digital radiotelephone, and FIG. 9 shows a format of a calling signal of the conventional digital radiotelephone.

In FIG. 8, numeral 1 denotes a telephone line of public network, numeral 2 is a keyboard for inputting telephone numbers and extension numbers, numeral 3 is a dial section for outputting a dial number to the telephone line 1, 4 is a receiver which is an output part of sound signals, 5 is a transmitter which is an input part of sound signals, 6 is a sound decoder for decoding digital signals to sound signals, 7 is a sound encoding unit for encoding sound signals to digital signals, 8 is a radio section consisting of a transmission circuit for converting the digital signals, to radio signals and a reception circuit for the reverse conversion, 9 is an antenna which is a transmission and reception part for radio signals, 10 is a controller for controlling the signals between each of the sections from the keyboard 2 to the antenna 9, 11 is a main unit comprising from the keyboard 2 to the controller 10.

Numeral 12 is a sub-unit keyboard for inputting a telephone numbers and extension numbers, numeral 13 is a sub unit receiver which is an output part of sound signals, 14 is a sub unit transmitter which is an input part of sound signals, 15 is a sub unit sound decoder for decoding digital signals to sound signals, 16 is a sub unit sound encoder for encoding sound signals to digital signals, 17 is a sub unit radio section consisting of a transmitting circuit for converting the digital signals to radio signals and a reception circuit for the reverse conversion, 18 is a sub unit antenna which is a transmission and reception part for radio signals, 19 is a sub unit controller for controlling the signals between each of the sections from the sub unit keyboard 12 to the sub unit antenna 18, 20 is a first sub unit comprising from a sub unit keyboard 12 to a sub unit controller 19. Numeral 21 is a first radiowave between the main unit 11 and the first sub unit 20. 22 is a second sub unit having the same constitution as of the first sub unit, and 23 is a second radiowave between the main unit 11 and the second sub unit 22.

The operation of the conventional digital radiotelephone system constituted as shown above will be illustrated.

When the first sub unit 20 makes private line communication with a second sub unit through the main unit 11, as shown in FIG. 8, the user of the first sub unit 20 of a call out side inputs first the extension number of the second sub unit 22 (12 in this conventional example). The sub unit controller 19 of the first sub unit 20 sends the call out request signal for requesting calling from the input extension number to the main unit 11, to the sub unit radio section 17, and the signal converted into radio signal in the sub unit radio section 17 is then sent to the sub unit antenna 18, and transmitted to the main unit 11 as the first radiowave 21.

The main unit 11 receives the first radiowave 21 through the antenna 9, and the radiowave is decoded to the call-out request signal at the radio section 8, then the controller 10 reads the extension number of the second sub unit 22 included in the call out request signal and sets the calling signal for calling the second sub unit 22, and after converted to a radio signal at the radio section 8, the calling signal is transmitted as the second radiowave 23 from the antenna 9 to the sub unit 22 as shown in FIG. 8.

The second sub unit 22 receives the second radiowave 23 through the sub unit antenna of the second sub unit 22 (the same structure and function as the sub unit antenna 18), and the radiowave is decoded to the calling signal at the sub unit radio section of the second sub unit 22 (the same structure and function as the sub unit radio section 17), then the sub unit controller of the second sub unit 22 (the same structure and function as the sub unit controller 19) judges if the extension number of the second sub unit 22 is included in the calling signal, and if the calling signal is included, a calling accept signal indicating the private communication is possible is converted into radio signal at the sub unit radio Section of the second sub unit 22 and sent from the sub unit antenna of the second sub unit 22 to the first sub unit 20 through the main unit 11 as the second radiowave 23 to make the private communication.

However, in the conventional constitution above, when the system has plural sub units for one main unit, only one extension number to be called can be set in a calling signal for calling from the main unit to sub units. Accordingly, each of the extension numbers have to be set and transmitted respectively for the calling from the main unit to a plurality of sub units or from one sub unit to plural sub units through the main unit at the same time.

SUMMARY OF THE INVENTION

The invention solves the problems of the prior art, and the object of the invention is to provide a digital radiotelephone system capable of calling a plurality of sub units from the main unit at the same time by multiplexing extension numbers of the plurality of sub units on the calling signal by the main unit, and capable of calling a plurality of sub units from other sub unit through the main unit at the same time by sending a signal including extension numbers of the plurality of sub units to be called, to the main unit successively.

To achieve the object, a radiotelephone system of the invention comprises: a keyboard, a radio section, an extension number multiplexer, and a control unit, wherein the extension numbers of a plurality of sub units input from said keyboard are multiplexed at said extension number multiplexer as a calling signal, accordingly setting of calling a plurality of sub units can be finished by one operation. Method of multiplexing a plurality of extension numbers is as follows: each of digits of the extension numbers is converted to a specific bit binary number, and specific bit delimiters are inserted between the extension numbers converted to binary numbers so that each of extension numbers is surely separately multiplexed and surely decodes as the calling signal.

Also, the extension numbers of sub units input from said keyboard unit and the extension numbers of other sub units input from another sub unit for requesting calling from the main unit to the other sub units are multiplexed at said extension number multiplexer as a calling signal so that both the callings from each of sub units and the calling from the main unit can be set as one calling signal. Further, the sub units have a calling management section for calling other plural sub units at the same time, thereby extension numbers of a plurality of the sub units to be called can be set by one operation, and the signals including extension numbers of a plurality of sub units to be called can be successively sent to the main unit. By this constitution of the invention, a plurality of sub units can be called at the same time, and further, the sub unit having the calling management section can call a plurality of other sub units at the same time through the main unit.

Thus, an excellent digital radiotelephone system in which, even the calling from the main unit to sub units, and the calling from a sub unit to other sub units through the main unit are overlapped, the main unit can call plural sub units to be called at the same time.

BRIEF DESCRIPTION OF DRAWINGS

FIG. 3 A chart showing the general example of the format of a calling signal of the digital radiotelephone system of the first embodiment of the invention.

FIG. 7 A chart showing the format of a calling signal of the digital radiotelephone system of the third embodiment of the invention.

FIG. 9 A chart showing a format of a calling signal of a conventional digital radiotelephone system.

DESCRIPTION OF THE PREFERRED EMBODIMENTS (Embodiment 1)

A first embodiment of the invention is described referring to figures.

Figure 1:
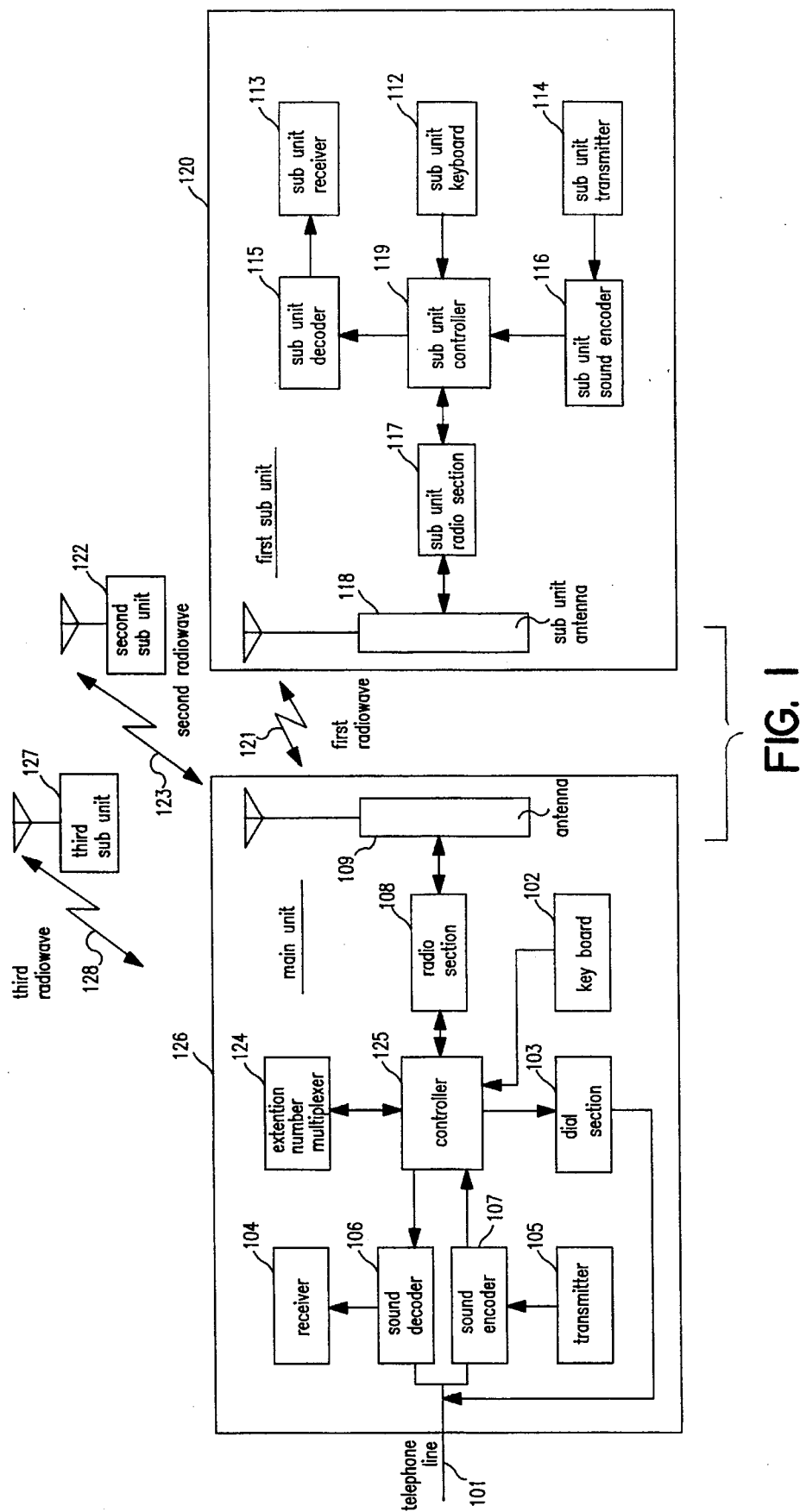
FIG. 1 A block diagram showing the constitution of a digital radiotelephone system of the first embodiment of the invention.
Figure 2:
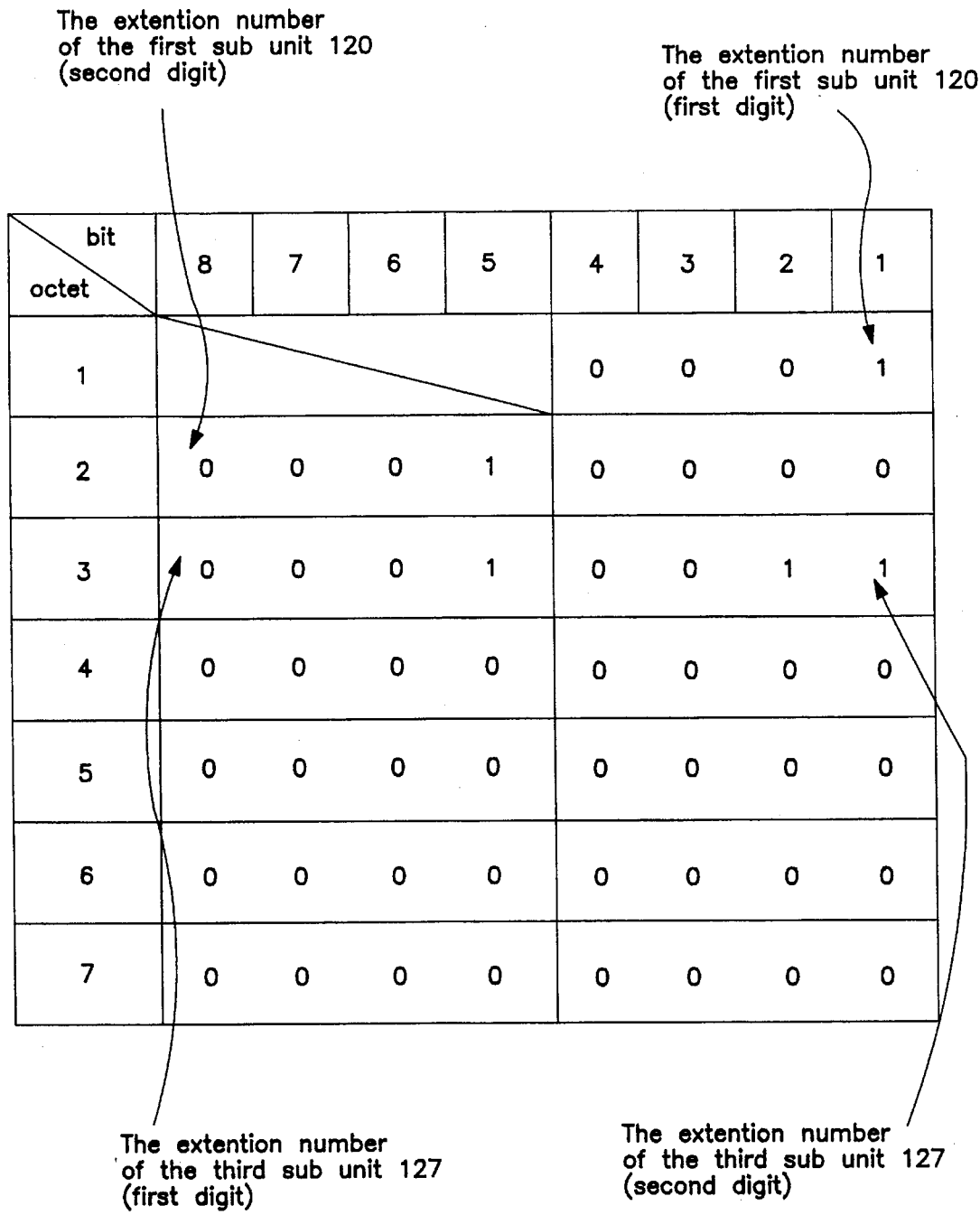
FIG. 2 A chart showing the format of a calling signal of the digital radiotelephone system of the first embodiment of the invention.

FIG. 1 is a block diagram showing the constitution of a digital radiotelephone system of the first embodiment of the invention, FIG. 2 is a chart showing the format of a calling signal of a digital radiotelephone system of the first embodiment of the invention.

In FIG. 1, numeral 101 denotes a telephone line of public network, numeral 102 is a keyboard for inputting telephone numbers and extension numbers, numeral 103 is a dial section for outputting a dial signal to the telephone line 101, 104 is a receiver which is an output part of sound signals, 105 is a transmitter which is an input part of sound signals, 106 is a sound decoder for decoding digital signals to sound signals, 107 is a sound encoder for encoding sound signals to digital signals, 108 is a radio section consisting of a transmission circuit for converting the digital signals to radio signals and a reception circuit for the reverse conversion. Numeral 109 is an antenna which is a transmission and reception part for radio signals, 124 is an extension number multiplexer which sets a calling signal from information of extension numbers of a plurality of sub units, 125 is a controller for controlling the signals between each of the sections from the keyboard 102 to the antenna 109 and the extension number multiplexer 124, 126 is a main unit comprising from the keyboard 102 to the antenna 109, the extension number multiplexer 124, and the controller 125.

Numeral 120 is a first sub unit comprising a sub unit keyboard 112 for inputting telephone numbers and extension numbers, a sub unit receiver 113 which is an output part of sound signals, a sub unit transmitter 114 which is an input part of sound signals, a sub unit sound decoder 115 for decoding digital signals to sound signals, a sub unit sound encoder 116 for encoding sound signals to digital signals, a sub unit radio section 117 consisting of a transmission circuit for converting the digital signals to radio signals and a reception circuit for the reverse conversion, a sub unit antenna 118 which is a transmission and reception part for radio signals, and, a sub unit controller 119 for controlling the signals between each of the sections from the sub unit keyboard 112 to the sub unit antenna 118. Numeral 121 is a first radiowave between the main unit 126 and the first sub unit 120. Numeral 122 is a second sub unit having the same constitution as of the first sub unit 120, 123 is a second radiowave between the main unit 126 and the second sub unit 122. Numeral 127 is a third sub unit having the same constitution as of the first sub unit 120 and second sub unit 122, 128 is a third radiowave between the main unit 126 and the third sub unit 127.

The operation of the the digital radiotelephone system constituted as shown above will be illustrated.

While the main unit 126 is calling the first sub unit 120, if the second sub unit 122 tries to call the third sub unit 127 through the main unit 126, the user of the main unit 126 inputs first the extension number of the first sub unit 120 (11 in this embodiment), and the controller 125 try to set a calling signal for calling the first sub unit as shown in FIG. 1.

But, the second sub unit 122 is trying to call the third sub unit 127 through the main unit 126 at the moment, if the extension number of the third sub unit 127 (13 in this embodiment) is input from the sub unit keyboard (the same as the sub unit keyboard 112 of the first sub unit 120), the sub unit controller of the second sub unit 122 (the same constitution and function as the sub unit controller 119 of the first sub unit 120) sends the call out request signal for requesting calling of the input extension number to the sub unit radio section of the second sub unit 122 (the same constitution and function as the sub unit radio section 117 of the first sub unit 120), and the signal is converted in a radio signal and then transmitted to the main unit 126 from the sub unit antenna of the second sub unit 122 (the same constitution and function as the sub unit antenna 18 of the first sub unit 120) as a second radiowave 123.

The main unit 126 receives the second radiowave at the antenna 109, and reverts it to the call out request signal at the radio section 108. The controller 125 reads out the extension number included in the call out request signal, and tries to set the calling signal for calling the third sub unit 127. Also trying to set the calling signal for calling the first sub unit 120 at this moment, the controller 125 informs of the extension number 11 of the first sub unit 120 and the extension number 13 of the third sub unit 127 to the extension number multiplexer 124. The extension number multiplexer 124 multiplexes the two informed extension numbers to a calling signal as shown in FIG. 2. Here, the calling signal is illustrated. Each of digits of the extension numbers is indicated by a 4 digit binary number, and set in a order of left to right and top to bottom. 0000 indicating a delimiter is set between the extension numbers of the sub units bellow. In this case, as the first sub unit 120 and the third sub unit 127 are called at the same time, a binary number 0001 of the first digit 1 of the extension number 11 of the first sub unit 120 and the binary number 0001 of the second digit 1 of the first sub unit 120 are set. 0000 indicating a delimiter between extension numbers and the binary number 0001 of the first digit 1 and the binary number 0011 of the second digit 3 of the third sub unit 127 are set successively, and all of the remaining columns are filled with 0000. Like wise, each of digits of the extension numbers is converted to each of 4 digit binary numbers. In this embodiment, each of the extension numbers is set in one octet and the binary number indicating a delimiter is placed between the extension numbers, and a plurality of the calling signals of the extension numbers are multiplexes to one calling signal.

FIG. 3 shows a general example of a format of a calling signal of the digital radiotelephone of the first embodiment of the present invention. The first column of four bits is the column for setting kinds of callings, each of digits of the extension number is allocated a four bit column successively, and a delimiter is placed between the extension numbers. When two digit extension numbers are used, four extension numbers can be set, likewise, three extension numbers for three digit extension numbers, and two extension numbers for four digit extension numbers can be set. When the calling signal for calling both the first sub unit 120 and the third sub unit 127 at the same time is set at the extension number multiplexer 124, the controller 125 sends the calling signal to the radio section 108 to convert to a radio signal, then transmits from the antenna 109 to the first sub unit 120 as a radiowave 121 and to the third sub unit 127 as a radiowave 128 respectively. Here, the first radiowave 121 and the third radiowave 128 are the same signal.

The first sub unit 120 receives the first radiowave 121 at sub unit antenna 118, and converts it to a calling signal of binary numbers at sub unit radio section 117. The sub unit controller 119 judges if the extension number 11 of the first sub unit 120 exists among the included extension numbers, each of extension numbers can be recognized because the calling signal is composed according to the rule mentioned above. If it exists, the sub unit controller 119 sends a calling acceptable signal which indicates the private line communication is capable to the sub unit radio section 117, converts it to a radio signal, and then transmits it from the sub unit antenna 118 to the main unit 126 as a first radiowave, so the private line communication becomes possible. Likewise, the third sub unit 127 receives the third radiowave and if the extension number 13 of the third sub unit 127 exists in the calling signal received, a calling acceptable signal is sent to the second sub unit 122 through the main unit 126, so the private line communication to the second sub unit 122 through the main unit 126 becomes possible.

According to the embodiment, by providing the extension number multiplexer 124 in the main unit 126 as mentioned above, the main unit can set one composite calling signal for calling both the first sub unit 120 from the main unit 126 and the third sub unit 127 from the second sub unit 122 through the main unit 126 and send the composite calling signal by using carrier radiowaves of respective sub units to be called.

That the same radiowaves are used, and each of sub units can read out a plurality of extension numbers included in a calling signal is the feature of the embodiment above. However, it is needless to say that the transmitting using the different frequency radiowaves for respective sub units can further prevent miss-action.

(Embodiment 2)

A second embodiment of the invention is described referring to figures.

Figure 4:
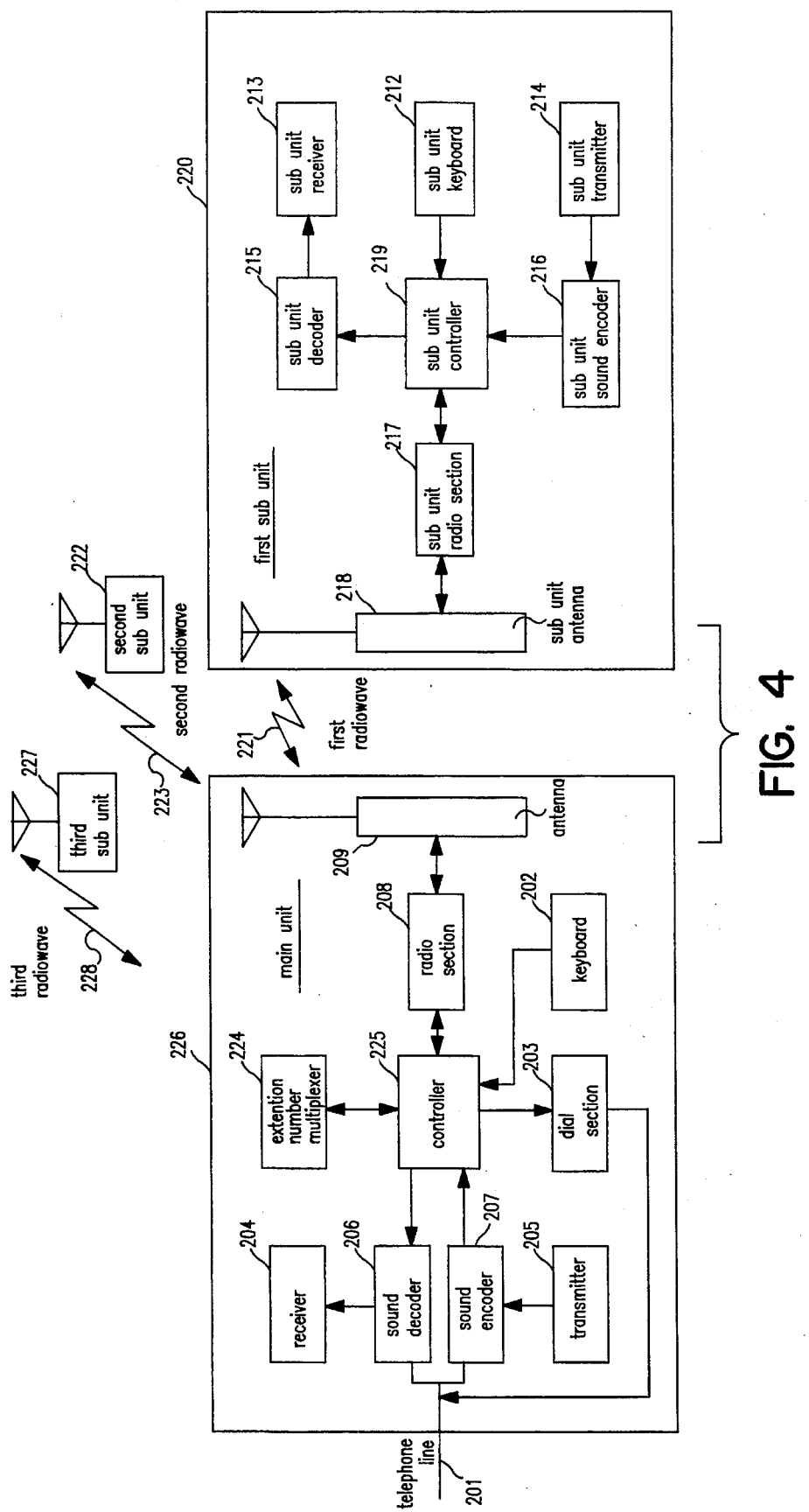
FIG. 4 A block diagram showing the constitution of a digital radiotelephone system of the second embodiment of the invention.
Figure 5:
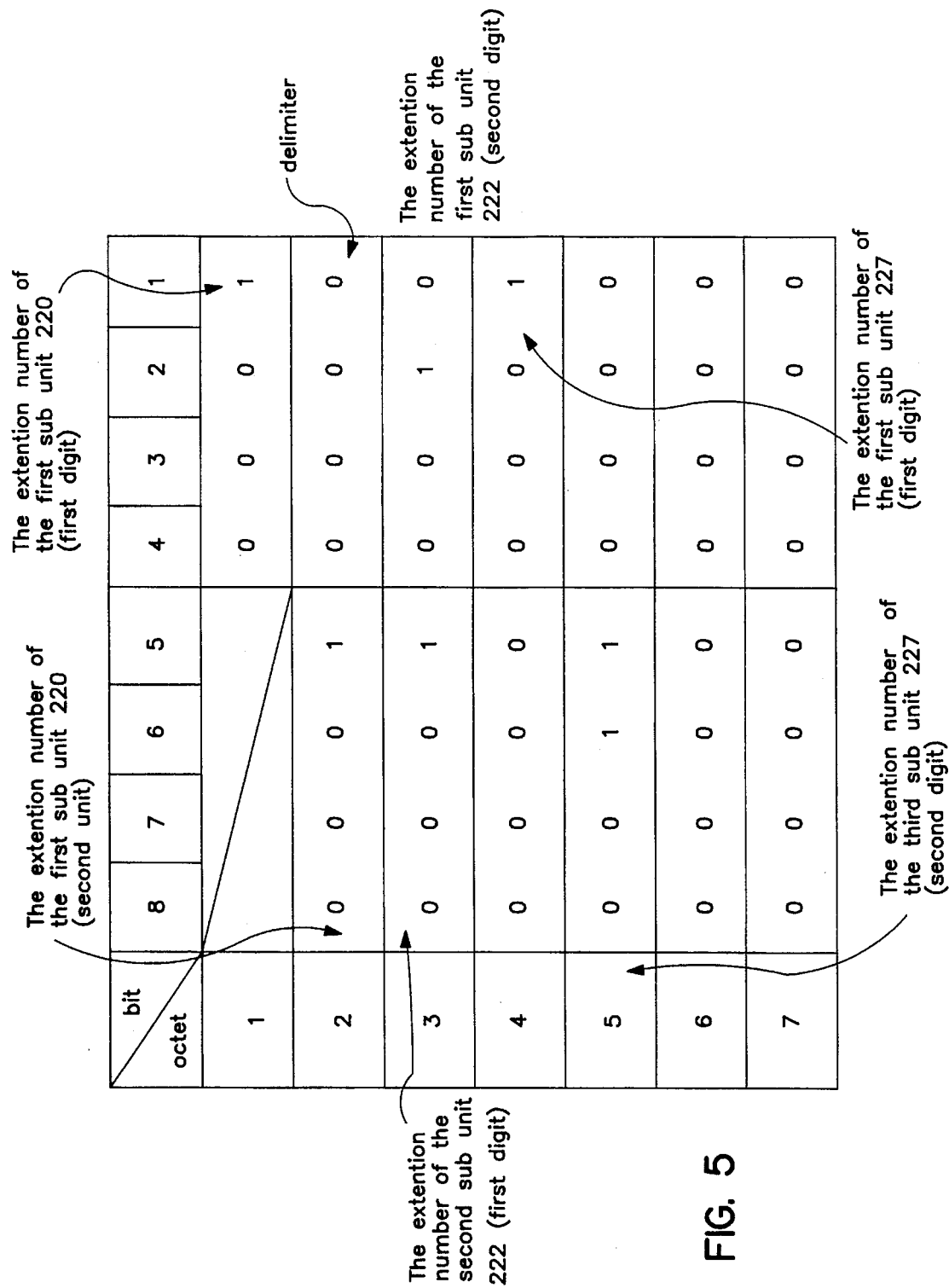
FIG. 5 A chart showing the general sample of the format of a calling signal of the digital radiotelephone system of the second embodiment of the invention.

FIG. 4 is a block diagram showing the constitution of a digital radiotelephone system of the second embodiment of the invention, FIG. 5 is a chart showing the format of a calling signal of the digital radiotelephone system of the second embodiment of the invention.

In FIG. 4, numeral 201 denotes a telephone line of public network, numeral 202 is a keyboard for inputting telephone numbers and extension numbers, numeral 203 is a dial section for outputting a dial signal to the telephone line 201, 204 is a receiver which is an output part of sound signals, 205 is a transmitter which is an input part of sound signals, 206 is a sound decoder for decoding digital signals to sound signals, 207 is a sound encoder for encoding sound signals to digital signals, 208 is a radio section consisting of a transmission circuit for converting the digital signals to radio signals and a reception circuit for the reverse conversion. Numeral 209 is an antenna which is a transmission and reception part for radio signals, 224 is an extension number multiplexer which sets a calling signal from information of extension numbers of a plurality of sub units, 225 is a controller for controlling the signals between each of the sections from the keyboard 202 to the antenna 209 and the extension number multiplexer 224, 226 is a main unit comprising from the keyboard 202 to the antenna 209, the extension number multiplexer 224, and the controller 225.

Numeral 220 is a first sub unit comprising a sub unit keyboard 212 for inputting telephone numbers and extension numbers, a sub unit receiver 213 which is an output part of sound signals, a sub unit transmitter 214 which is an input part of sound signals, a sub unit sound decoder 215 for decoding digital signals to sound signals, a sub unit sound encoder 216 for encoding sound signals to digital signals, a sub unit radio section 217 consisting of a transmitting circuit for converting the digital signals to radio signals and a reception circuit for the reverse conversion, a sub unit antenna 218 which is a transmission and reception part for radio signals, and, a sub unit controller 219 for controlling the signals between each of the sections from the sub unit keyboard 212 to the sub unit antenna 218. Numeral 221 is a first radiowave between the main unit 226 and the first sub unit 220. Numeral 222 is a second sub unit having the same constitution as of the first sub unit 220, 223 is a second radiowave between the main unit 226 and the second sub unit 222. Numeral 227 is a third sub unit having the same constitution as of the first sub unit 220 and second sub unit 222, 228 is a third radiowave between the main unit 226 and the third sub unit 227.

The operation of the the digital radiotelephone system constituted as shown above will be illustrated.

When the main unit 226 calls all of the sub units at the same time, the user of the main unit 226 inputs first from the keyboard 202 the extension numbers of the first sub unit 220, the second sub unit 222, and the third sub unit 227 continuously (in this embodiment, the extension number of the first sub unit is 11, and 12 for the second sub unit 222, 13 for the third sub unit).

The controller 225 informs the three extension numbers input to the extension number multiplexer 224. The extension number multiplexer 224 multiplexes the three informed extension numbers by converting each of digits of the extension numbers to 4-bit binary numbers, and set 4-bit delimiters between the extension numbers as shown in FIG. 5. That is, one composite calling signal is formed as follows: binary number 0001 of the first digit 1 of the extension number 11 of the first sub unit 220 and binary number 0001 of the second digit 1 of the extension number 11 of the first sub unit 220 are first set, then 0000 indicating a delimiter between extension numbers is placed in the next column, then binary number 0001 of the first digit 1 of the extension number 12 of the second sub unit 221 and binary number 0010 of the second digit 2, then 0000 indicating a delimiter between extension numbers, then binary number 0001 of the first digit 1 of the extension number 13 of the third sub unit 227 and binary number 0011 of the second digit 3 are placed successively. The calling signal formed here is sent to the radio section 208 by the controller 225, converted to a radio signal, and transmitted from the antenna 209 to the first sub unit 220, the second sub unit 222, and the third sub unit 227 as the first radiowave 221, the second radiowave 223, and the third radiowave 228 respectively. Here, the first radiowave 221, the second radiowave 223, and the third radiowave 228 are the same signal. The first sub unit 220 receives the first radiowave 221 at the sub unit antenna 218, converts it to a binary calling signal at the sub unit radio section 217, recognizes each of the extension numbers by the reverse operation of said composing rule and judges if the extension number of the first sub unit 220 is exists. If it exists, the sub unit controller 219 sends a calling acceptable signal to the sub unit radio section 217, and the signal is converted to a radio signal, then transmitted from the sub unit antenna 218 as the first radiowave to the main unit 226 and the private line communication becomes possible. The second sub unit 222 and the third sub unit 227 can also make private line communication by the same operations as the first sub unit, but only one sub unit which connected first can actually make private line communication among the three sub units.

As mentioned above, the main unit 226 of the embodiment can set one composite calling signal for calling all of the sub unit at the same time and can transmit it by each of the radiowaves of the sub units to be called.

(Embodiment 3)

A third embodiment of the invention is described referring to figures.

Figure 6:
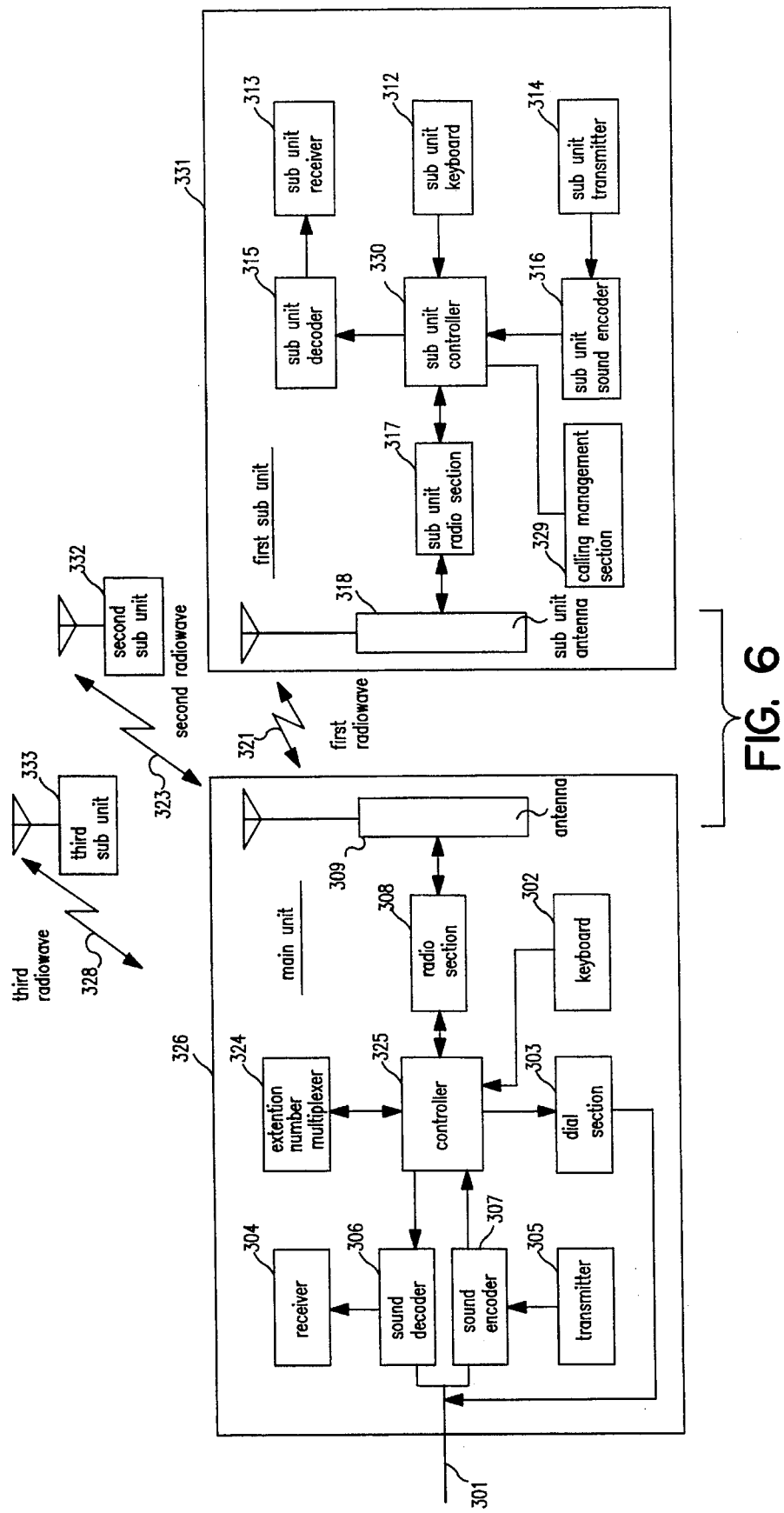
FIG. 6 A block diagram showing the constitution of a digital radiotelephone system of the third embodiment of the invention.
Figure 8:
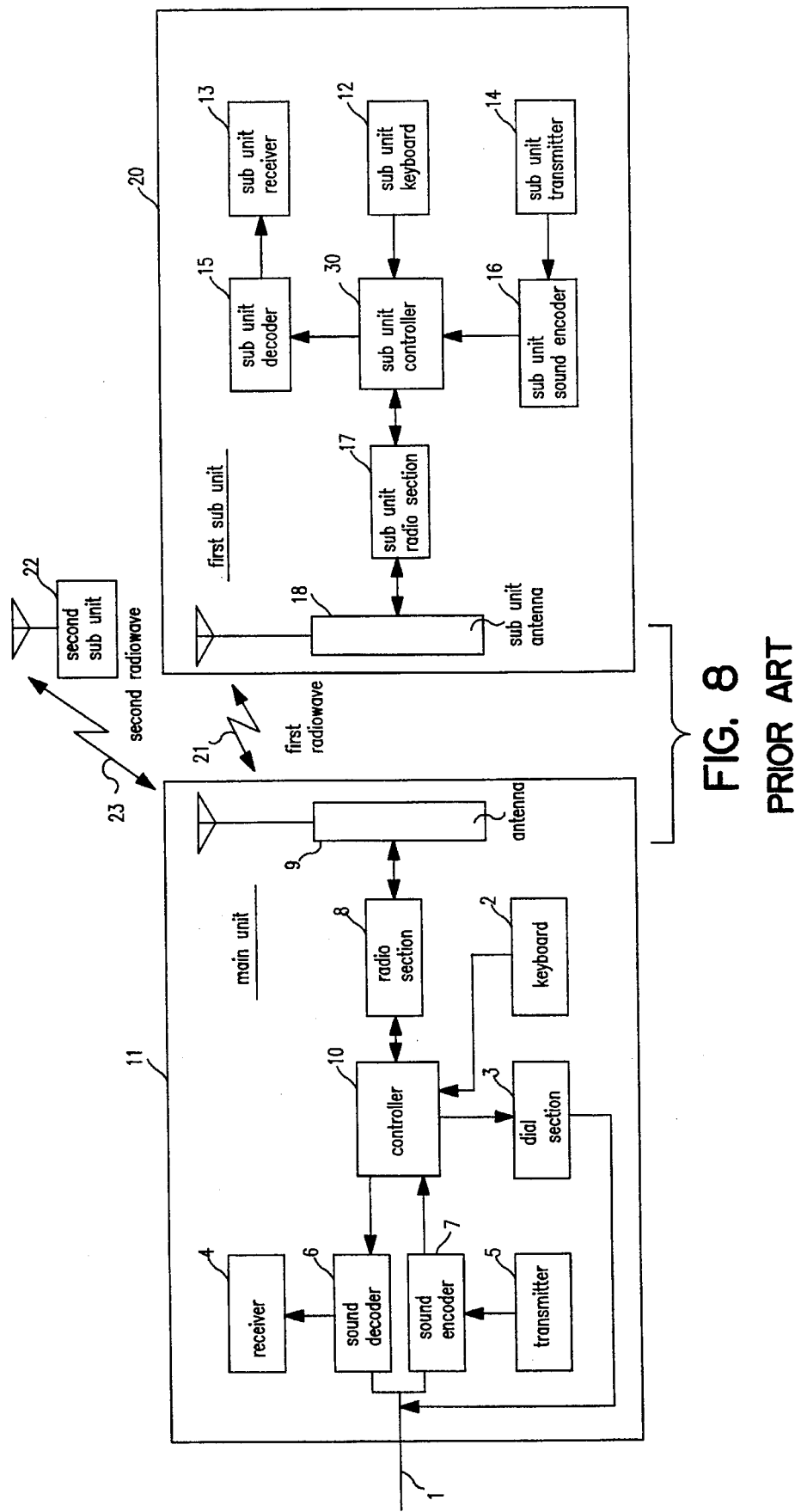
FIG. 8 A block diagram showing a constitution of a conventional digital radiotelephone system.

FIG. 6 is a block diagram showing the constitution of a digital radiotelephone system of the third embodiment of the invention, FIG. 7 is a chart showing the format of a calling signal of the digital radiotelephone system of the third embodiment of the invention.

In FIG. 6, numeral 301 denotes a telephone line of public network, numeral 302 is a keyboard for inputting telephone numbers and extension numbers, numeral 303 is a dial section for outputting a dial signal to the telephone line 301, 304 is a receiver which is an output part of sound signals, 305 is a transmitter which is an input part of sound signals, 306 is a sound decoder for decoding digital signals to sound signals, 307 is a sound encoder for encoding sound signals to digital signals, 308 is a radio section consisting of a transmission circuit for converting the digital signals to radio signals and a reception circuit for the reverse conversion. Numeral 309 is an antenna which is a transmission and reception part for radio signals, 324 is an extension number multiplexer which sets a calling signal from information of extension numbers of a plurality of sub units, 325 is a controller for controlling the signals between each of the sections from the keyboard 302 to the antenna 309 and the extension number multiplexer 324, numeral 326 is a main unit comprising from the keyboard 302 to the antenna 309, the extension number multiplexer 324, and the controller 325.

Numeral 331 is a first sub unit comprising a sub unit keyboard 312 for inputting telephone numbers and extension numbers, a sub unit receiver 313 which is an output part of sound signals, a sub unit transmitter 314 which is an input part of sound signals, a sub unit sound decoder 315 for decoding digital signals to sound signals, a sub unit sound encoder 316 for encoding sound signals to digital signals, a sub unit radio section 317 consisting of a transmission circuit for converting the digital signals to radio signals and a reception circuit for the reverse conversion, a sub unit antenna 318 which is a transmission and reception part for radio signals, a calling managing section 329 for managing a plurality of signals of the input extension numbers and sending them out continuously, and, a sub unit controller 330 for controlling the signals between each of the sections from the sub unit keyboard 312 to the sub unit antenna 318 and the calling manage section 329. Numeral 332 is a second sub unit, 333 is a third sub unit, they have the same constitution as of the first sub unit 331. The different point of the embodiment from the first embodiment is the sub units have the calling management section 329.

The operation of the the digital radiotelephone system constituted as shown above will be illustrated.

When a sub unit calls other plural sub units at the same time through the main unit 326, the user of the first sub unit 331 inputs first the extension numbers of the second sub unit 332 and the third sub unit 333 successively from the sub unit keyboard 312 (in this embodiment, the extension number of the second sub unit 332 is 312, and the extension number of the third sub unit 333 is 313). The sub unit controller 330 sets call out request signals from the two extension numbers input successively. The call out request signals are managed in the calling management section 329, and then sent to the sub unit radio section 317, the two call out signals are converted to radio signals and transmitted continuously from the sub unit antenna 318 to the main unit 326 as the first radiowave 321.

The main unit 326 receives the first radiowave 321 at the antenna 309, returns it to the call out request signal at the radio section 308. The controller 325 reads the extension numbers from the two call out request signals, and informs of them to the extension number multiplexer 324. In which the two extension numbers are converted to binary numbers according to the rule shown in FIG. 7 to a calling signal relating to calling. The calling signal is sent to the radio section 308 by the controller 325, converted in radio signal, then transmitted from the antenna 309 to the second sub unit 332 and the third sub unit 333 as the second radiowave 323 and the third radiowave 328 respectively. Here, the second radiowave 323 and the third radiowave 328 are the same signal.

The first sub unit 332 receives the second radiowave 323 at the sub unit antenna (the same constitution and function as the sub unit antenna 318), returns it to the calling signal at the sub unit radio section (the same constitution and function as the sub unit radio section 317). The sub unit controller of the second sub unit 332 (the same constitution and function as the sub unit controller 330) reads out extension numbers included in the calling signal according to the above rule and judges if the extension number of the second sub unit 332 is exists in the two extension numbers read out. If it exists, the sub unit controller of the second sub unit 332 sends a calling acceptable signal which indicate private line communication is ready to the sub unit radio section of the second sub unit 332, the signal is converted in radio signal and transmitted from the sub unit antenna of the second sub unit 332 as the second radiowave 323 through the main unit 326 to the first sub unit 331, and the private line is connected.

The third sub unit 333 also can communicate with the first sub unit 331 through the main unit 326 by the same operations as of the second sub unit 332. But only the one sub unit connected first can actually make private line communication.

As mentioned above, in the embodiment, the first sub unit 331 can call the second sub unit 332 and the third sub unit 333 through the main unit 326 at the same time by providing the calling management section 329.

As obviously seen in the above embodiments, by providing the extension number multiplexer for multiplexing a plurality of extension numbers of the sub units in the main unit, not only the extension numbers of a plurality of the sub units called from the main unit, but also the extension number of a sub unit called from another sub unit are multiplexes and transmitted. Further by providing a calling management section in sub units, a plurality of callings from the sub units can be multiplexed in a calling signal and transmitted from the main unit. That is, the main unit can multiplex a plurality of extension numbers in the calling signal. The sub unit can continuously transmit request signals for calling other sub units.

In the embodiments above, single main unit was discussed though, it is needless to say that the system comprising a plurality of main units have the similar effect.

What is claimed is:

1. A digital radiotelephone system having a plurality of sub units and a main unit,
   said main unit comprising:
      a radio section for conducting radio communication with said plurality of sub units;
      a number multiplexer for multiplexing a plurality of sub unit numbers to generate a calling information signal stream, wherein each sub unit number corresponds to one of said plurality of sub units and each sub unit number is represented by a respectively different portion of said signal stream;
      a controller for controlling the transmission of the calling information signal stream to said plurality of sub units simultaneously.

2. The digital radiotelephone system of claim 1, further comprising a keyboard, wherein said number multiplexer multiplexes a plurality of sub unit numbers input from said keyboard to generate the calling information signal stream.

3. The digital radiotelephone system of claim 1, further comprising a keyboard, wherein said number multiplexer multiplexes sub unit numbers input from said keyboard and sub unit numbers transmitted by the sub units, to generate the calling information signal stream, wherein the sub unit numbers are input from said keyboard at the same time said radio section receives at least one sub unit number from said sub units.

4. The digital radiotelephone system of claim 1, wherein said number multiplexer multiplexes a plurality of sub unit numbers to generate the calling information signal stream by converting each digit of the plurality of sub unit numbers to a specific bit binary number, and forming a bit configuration in which delimiters of a specific bit binary number are inserted between the sub unit numbers converted to binary numbers.

5. The digital radiotelephone system of claim 1, wherein said controller controls the calling information signal stream generated by said number multiplexer which is transmitted by a carrier radiowave emitted from said radio section.

6. A digital radio telephone system having a main unit connected to a telephone line and a plurality of sub units for conducting radio communication with said main unit, said main unit comprising:
   a radio section for conducting communication with a plurality of said sub units;
   a number multiplexer for multiplexing a plurality of sub unit numbers to generate a calling information signal stream, wherein each sub unit number is represented by a respectively different portion of said signal stream;
   a controller for controlling the transmission of the calling information signal stream to said sub units simultaneously;
   each of said plurality of sub units comprising:
      a sub unit radio section for conducting radio communication with said main unit;
      a sub unit controller for controlling said sub unit radio section to conduct radio communication with said main unit if the calling information signal stream transmitted from said main unit and received by said sub unit radio section includes a sub unit number corresponding to a respective one of said plurality of sub units.

7. The digital radiotelephone system of claim 6, said main unit further comprising a keyboard, wherein said number multiplexer multiplexes a plurality of sub unit numbers input from said keyboard to generate the calling information signal stream.

8. The digital radiotelephone system of claim 6, said main unit further comprising a keyboard, wherein said number multiplexer multiplexes sub unit numbers input from said keyboard and sub unit numbers transmitted by the sub units, to generate the calling information signal stream, wherein the sub unit numbers are input from said keyboard at the same time said radio section receives at least one sub unit number from said sub units, and
   each of said sub units further comprises a sub unit keyboard, wherein said sub unit controller controls the sub unit radio section to transmit a sub unit number to said main unit when the sub unit number is input from said sub unit keyboard.

9. The digital radiotelephone system of claim 6, wherein said number multiplexer multiplexes a plurality of sub unit numbers to generate the calling information signal stream by converting each digit of the plurality of sub unit numbers to a specific bit binary number, and forming a bit configuration in which delimiters of a specific bit binary number are inserted between the sub unit numbers converted to binary numbers.

10. The digital radiotelephone system of claim 6, wherein said controller controls the calling information signal stream generated by said number multiplexer which is transmitted by a carrier radiowave emitted from said radio section.

11. A digital radiotelephone system including a main unit and a plurality of sub units which communicate with said main unit, said main unit comprising:

a radio section for conducting radio communication with said main unit;

a number multiplexer for multiplexing a plurality of sub unit numbers to generate a calling information signal stream, wherein each sub unit number corresponds to one of said plurality of sub units and each sub unit number is represented by a respectively different portion of said signal stream;

a controller for controlling the transmission of the calling information signal stream to said plurality of sub units simultaneously.

12. The digital radiotelephone system of claim 11, further comprising a keyboard, wherein said number multiplexer multiplexes a plurality of sub unit numbers input from said keyboard to generate the calling information signal stream.

13. A digital radiotelephone system having a main unit connected to a telephone line and a plurality of sub units for conducting radio communication with said main unit, said main unit comprising:

a radio section for conducting radio communication with a plurality of said sub units;

a number multiplexer for multiplexing a plurality of sub unit numbers to generate a calling information signal stream, wherein each sub unit number corresponds to one of said plurality of sub units and each sub unit number is represented by a respectively different portion of said signal stream;

a controller for controlling the transfer of the calling information signal stream to said sub units simultaneously;

said a plurality of sub units comprising:

a sub unit radio section for conducting radio communication with the main unit;

a calling management section for managing a plurality of sub unit numbers as a sub unit calling information signal;

a sub unit controller for controlling the sub unit calling information signal managed by said calling management section which is transmitted to said main unit by said sub unit radio section, and for controlling said sub unit radio section so as to conduct radio communication with the main unit if the calling information signal stream transmitted from said main unit and received by said sub unit radio section includes a sub unit number corresponding to said sub unit.

14. The digital radiotelephone system of claim 13, wherein each of said sub units further comprises a sub unit keyboard, wherein said calling management section manages a plurality of sub unit numbers input from said sub unit keyboard to generate the sub unit calling information signal.

15. The digital radiotelephone system of claim 13, wherein said main unit further comprises a keyboard, and said number multiplexer multiplexes each sub unit number input from said keyboard and the plurality of sub unit numbers included in the sub unit calling information signal transmitted by each sub unit, to generate the calling information signal stream, wherein each sub unit number is input from said keyboard and said radio section receives the sub unit calling information signal from said sub unit at the same time.

16. The digital radiotelephone system of claim 13, wherein said number multiplexer multiplexes said plurality of sub unit numbers to generate the calling information signal stream by converting each digit of the plurality of the sub unit numbers to specific bit binary numbers, and forming a bit configuration in which delimiters of specific bit binary numbers are inserted between the sub unit numbers converted to binary numbers.

17. The digital radiotelephone system of claim 13, wherein said controller controls the calling signal stream multiplexed by said number multiplexer which is transmitted by a carrier radiowave emitted from said radio section.

* * * * *